United States Patent [19]
Hirano et al.

[11] Patent Number: 6,089,778
[45] Date of Patent: Jul. 18, 2000

[54] JOINT

[75] Inventors: Seiji Hirano; Asao Shoda, both of Shizuoka, Japan

[73] Assignee: Yazaki Industrial Chemical Co., LTD, Japan

[21] Appl. No.: 09/110,028

[22] Filed: Jul. 2, 1998

[51] Int. Cl.[7] .................................................. F16B 7/02
[52] U.S. Cl. ....................... 403/231; 403/403; 403/170; 403/217; 40/782
[58] Field of Search .................................. 403/230, 231, 403/401, 402, 403, 382, 205, 170, 169, 217; 40/299.1, 661.03, 649, 642.02, 700, 706, 709, 781, 765, 782

[56] References Cited

U.S. PATENT DOCUMENTS

| D. 397,211 | 8/1998 | Hirano et al. | D23/262 |
| D. 397,212 | 8/1998 | Hirano et al. | D23/262 |
| 4,662,092 | 5/1987 | Kim | 40/784 |
| 5,617,660 | 4/1997 | Pollack | 40/611 |
| 5,938,365 | 8/1999 | Grewe et al. | 40/782 X |

*Primary Examiner*—Lynne H. Browne
*Assistant Examiner*—John R. Cottingham
*Attorney, Agent, or Firm*—Eric P. Schellin

[57] ABSTRACT

A joint has a plurality of synthetic resin hollow tubes inserted a plurality of resin-coated steel pipes which are formed by applying a coating resin on a surface of a thin wall steel pipe and are formed with at least one pair of fitting ribs extending in an axial direction on the coating resin for holding an edge of a partitioning body, in order to connect the resin-coated steel pipes in an intersecting fashion. The joint also includes slits which permit a pair of fitting ribs of the resin-coated steel pipes therethrough, are formed on reentrant side of at least adjacent two hollow tubes among a plurality of hollow tubes at positions in one plane extending across respective axes of the hollow tubes and extending over the entire length, and cover ribs which are formed integrally with the hollow tubes and extending along both sides of the entire length of the slits for covering outer side surfaces of a pair of fitting ribs of the resin-coated steel pipe.

8 Claims, 17 Drawing Sheets

JOINT

BACKGROUND OF THE INVENTION

1. Field of the Invention

The present invention relates a synthetic resin joint for connecting a plurality of resin-coated steel pipes, each of which has a resin coating on a peripheral surface of a thin wall steel pipe and formed with at least one pair of fitting ribs for holding an edge of a panel form or a net form partitioning body, by a bond, in order to form small scale pipe structures such as a recovery platform, a jumble kart or so forth.

2. Description of the Related Art

Conventionally, as a joint of the type, to which the present invention concerned, it has been known a synthetic resin joint 103 formed by intersectingly connecting a plurality of cylindrical tubes 101 and 102 via an adhesive or a bond, to which resin-coated metal beams formed by coating surfaces (outer peripheral surfaces) of thin wall steel pipes by a synthetic resin material, as shown in FIG. 37.

It should be noted that there are a large number of kinds of joints depending upon form (blind, through or so forth) to be connected, and lengths, number, relative positions, orientations and the like of respective cylindrical tubes.

However, when a plurality of resin-coated metal beams 108, each of which is formed with at least one pair of fitting ribs 107 over the entire length thereof on a coat resin 105 coating a surface (outer peripheral surface) of a thin wall steel pipe 104 in order to hold an edge of a panel form or net form partitioning body 106, are connected by means of the conventional joint 104 in order to form small scale pipe structures, such as a recovery plate form, a jumble kart, a screen or so forth as shown in FIG. 38, it becomes necessary to cut away the fitting ribs 107 at the end portions of the resin-coated steel pipes 108 to be engaged with the cylindrical tubes 101 and 102 of the joint 103.

Therefore, it requires a work load for a fabrication process which inherently result in increasing cost.

On the other hand, upon assembling of a pipe framework, a drawback is encountered in that a corner portion of the edge of the partitioning body 106 is externally exposed associating with cutting away of the fitting rib 107 at the end portions of the resin-coated steel pipes 108 on the side of a reentrant angle of the adjacent two cylindrical tubes 101 and 102 of the joint 103, as shown in FIG. 39.

In order to avoid such drawback, it may be possible to provide a fabrication process for the joint 103 in order to form axially extending partial slits 109 and 110 on the side of the reentrant angle of the adjacent two cylindrical tubes 101 and 102 of the joints 103 for permitting the pair of fitting ribs 107 of the resin-coated steel pipes 108 to project therethrough, as shown in FIG. 40.

However, similar to the foregoing prior art, such measure requires extra workload for the fabrication process which inherently results in increasing cost.

In addition, by formation of the slits 109 and 110, a bending strength of the joint 103 can be significantly lowered. This drawback is equally encountered even when the slits 109 and 110 are formed initially before molding process of the joint 103.

Furthermore, upon assembling the pipe framework, similar to the foregoing prior art, a drawback that the corner portion of the edge of the partitioning body 106 is exposed to cause degradation of external appearance on the side of the reentrant angle of the adjacent two cylindrical tubes 101 and 102 of the joint 103, as shown in FIG. 41.

In FIGS. 40 and 41, the reference numeral 111 denotes a synthetic resin inner cap fitted over the end portion of the resin-coated steel pipe 108.

On the other hand, in order to avoid the drawback of the prior art, it is possible to form a slit 115 over the entire length in a molding process or the fabrication process so that the slit 115 is located within one plane including respective axes for permitting the fitting rib 107 of the resin-coated steel pipe 108 to project therethrough, on the reentrant angle side of adjacent two cylindrical tubes 113 and 114, as in a joint 112 shown in FIG. 42.

However, when the pipe framework is assembled by abutting the resin-coated steel pipe 108 to be inserted into one cylindrical tube 113 with the other resin-coated steel pipe 108 to be inserted into the other cylindrical tube 114, and by fitting the inner cap 111 on the end portion of the resin-coated steel pipe 108 inserted into one cylindrical tube 113, in addition to the drawbacks similar to those encountered in the case where the partial slits 109 and 110 are formed, a drawback in exposure of the edge at the corner portion of the partitioning body 106 due to thickness of flange of the inner cap 111 on the side of the reentrant angle side of the adjacent two cylindrical tubes 113 and 114 of the joint 112, is encountered.

SUMMARY OF THE INVENTION

Therefore, it is a major object of the present invention to provide a joint which does not require a fabrication process and can avoid degradation of external appearance.

Another object of the present invention is to provide a joint which can improve mechanical strength in addition to the foregoing object.

In order to accomplish the above-mentioned and other objects, according to one aspect of the present invention, a joint, in which a plurality of synthetic resin hollow tubes are inserted a plurality of resin-coated steel pipes which are formed by applying a coating resin on a surface of a thin wall steel pipe and are formed with at least one pair of fitting ribs extending in an axial direction on the coating resin for holding an edge of a partitioning body, in order to connect the resin-coated steel pipes in an intersecting fashion, comprises:

slits, permitting a pair of fitting ribs of the resin-coated steel pipes therethrough, formed on reentrant side of at least adjacent two hollow tubes among a plurality of hollow tubes at positions in one plane extending across respective axes of the hollow tubes and extending over the entire length; and covering ribs formed integrally with the hollow tubes and extending along both sides of the entire length of the slits for covering outer side surfaces of a pair of fitting ribs of the resin-coated steel pipe.

In the construction set forth above, small diameter portion may be formed on an intersecting portion side of one of the adjacent hollow tubes with locating a stepped portion corresponding to a tip end portion of the covering rib of the other hollow tube, an auxiliary rib formed by extending a pair of covering ribs of the other hollow tube may be extended at least to the center portion and one of the auxiliary ribs may be connected to a reinforcement plate on an opening end side.

The reinforcement plate may be accommodated within the resin-coated steel pipe, into which one hollow tube is inserted.

The tip end portion of the covering rib may be formed with a covering portion covering the tip end face of the fitting ribs of the resin-coated steel pipe.

The end face on the opening end side of the other hollow tube may be formed in flush with the tip end face of the covering rib of the one of the hollow tubes.

According to a second aspect of the present invention, a joining structure for a pipe structure employing a plurality of resin-coated steel pipes and a joint providing for connecting the resin-coated steel pipes with intersecting longitudinal axes of respective resin-coated steel pipes, comprises:

at least one pair of fitting ribs formed on a coating resin layer formed on an outer peripheral surface of a thin wall steel pipe forming the resin-coated steel pipe for holding an edge of a panel form body forming a part of the pipe structure;

hollow tubes respectively extending in directions corresponding to directions, to which respective of the resin coated steel pipes to be joined, and integrally connected across a connecting portion in angled orientations, each of the hollow tubes accommodating an end portion of each resin-coated steel pipe to be jointed, slits being formed on reentrant sides of at least adjacent two hollow tubes and extending in axial directions of respective hollow tubes, for permitting the fitting ribs to outwardly extend therethrough; and covering ribs formed integrally with the hollow tubes and extending along both sides of the entire length of the slits for covering outer side surfaces of a pair of fitting ribs of each of the resin-coated steel pipe.

At least one of the adjacent two hollow tubes may be formed with a an inwardly extending shoulder portion for abutting with an axial end of the resin-coated steel pipe received within the corresponding hollow tube.

The joining structure may further comprise auxiliary ribs formed by extending a pair of covering ribs of the other hollow tube is extended at least to the center portion and one of the auxiliary ribs is connected to a reinforcement plate on an opening end side.

The inwardly extending shoulder may be located at an axial position corresponding to a tip end portion of the covering ribs.

The reinforcement plate may be accommodated within the resin-coated steel pipe, into which one hollow tube is inserted.

The tip end portion of the covering rib may be formed with a covering portion covering the tip end face of the fitting ribs of the resin-coated steel pipe.

The end face on the opening end side of the other hollow tube may be formed in flush with the tip end face of the covering rib of the one of the hollow tubes.

In the alternative embodiment, at least one of the adjacent two hollow tubes may be formed with a wall portion for separating an interior space of the at least one of the adjacent two hollow tubes into two mutually separated spaces in order to receive the end portion of the resin-coated steel pipe with abutting an axial end of the resin-coated steel pipe onto the wall portion.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
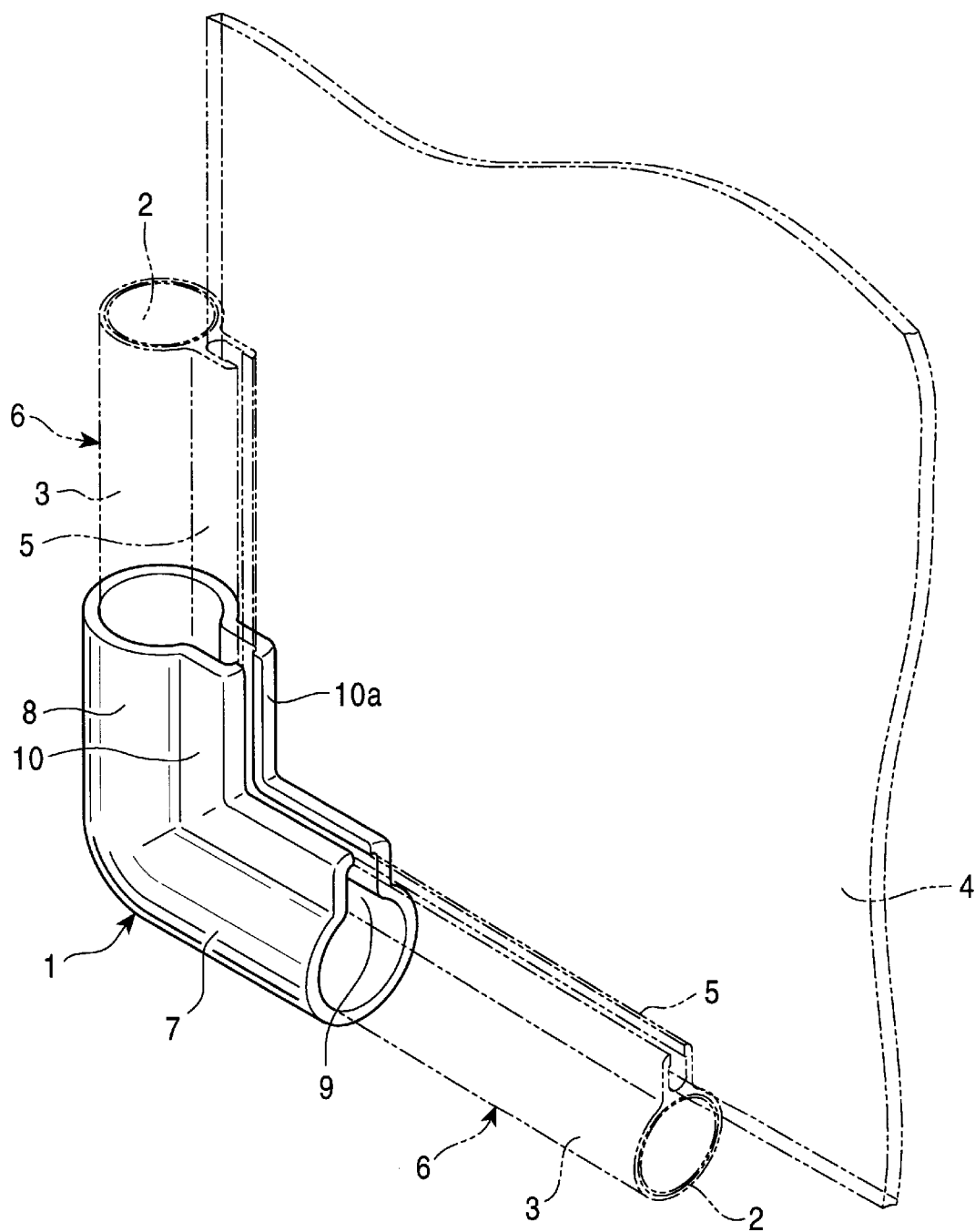
FIG. 1 is a perspective view showing the first embodiment of a joint according to the present invention.
Figure 2:
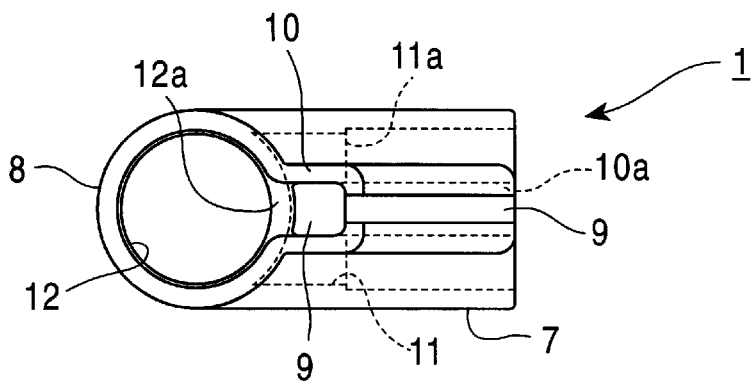
FIG. 2 is a plan view of the joint of FIG. 1.
Figure 3:
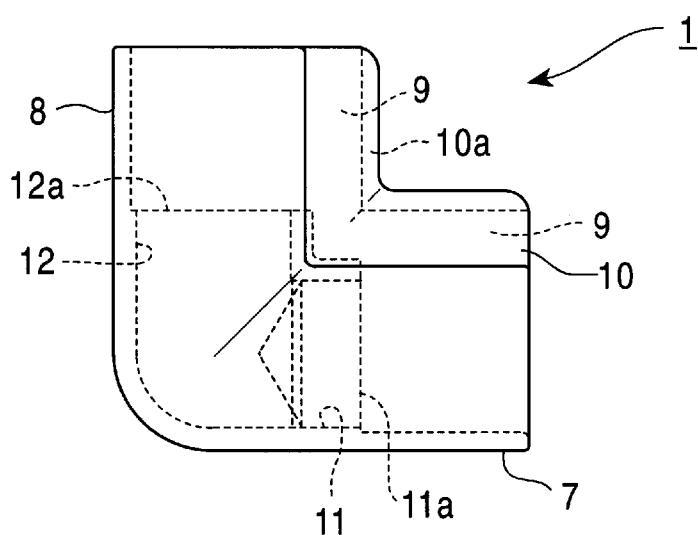
FIG. 3 is a front elevation of the joint of FIG. 1.
Figure 4:
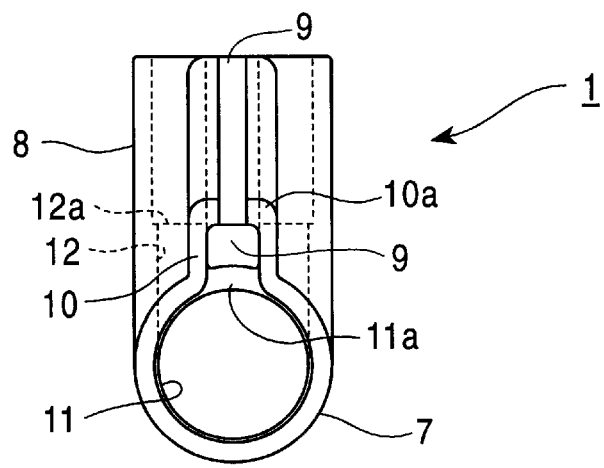
FIG. 4 is a right side view of the joint of FIG. 1.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

The preferred embodiment of the present invention will be discussed hereinafter with reference to the drawings.

FIGS. 1, 2, 3 and 4 are perspective view, a plan view, a front elevation and a right side view showing the first embodiment of a joint according to the present invention.

The shown joint 1 is designed for perpendicularly joining two resin-coated steel pipes 6, each of which is formed by forming a pair of axially extending fitting ribs 5 over the entire length for holding a peripheral edge of a panel form or a net form partitioning body 4 on a coat resin 3 coating a surface (outer peripheral surface) of a thin wall steel tube 2 having a diameter in a range of from about 26 to about 32 mm, with abutting the end edges thereof with each other. Two synthetic resin cylindrical tubes 7 and 8 of equal length, into which cylindrical portions of the resin-coated steel pipes 6 are inserted via a bond, are connected into L-shaped configuration via a curved connecting portion.

On the side of the reentrant angle of two cylindrical tubes 7 and 8, slits 9 are formed over the entire length for permitting the pair of fitting ribs 5 of the resin-coated steel pipe 6 to project therethrough so that those slits 9 are located on one plane extending across respective axes of said cylindrical tubes 7 and 8. In both cylindrical tubes 7 and 8, covering ribs 10 covering outer side surfaces of the pair of fitting ribs 5 of the resin-coated steel pipe 6 are integrally formed on both sides of the slits 9 over the entire length. On the tip end portions of respective covering ribs 10, inwardly bent portions 10a fitted over the tip end faces of the fitting ribs 5 of the resin-coated steel pipe 6, are formed.

On the other hand, on the side of an intersecting portion (left end in FIG. 3) of one cylindrical tube 7, an end face of the resin-coated steel pipe 6 is formed with a small diameter portion 11 corresponding to the tip end portions of the covering ribs 10 of the other cylindrical tube 8. Also, on the side of an intersecting portion (lower end in FIG. 3) of the other cylindrical tube 8, a small diameter portion 12 is formed with locating a stepped portion 12a to which the end face of the resin-coated steel pipe 6 abuts, corresponding to the tip end portions of the covering ribs 10 of one cylindrical tube 7.

In order to connect the resin-coated steel pipes 6 by the foregoing joint 1, as shown in FIG. 1, the resin-coated steel pipes 6 are inserted into both cylindrical tubes 7 and 8 with abutting the end faces thereof against the stepped portions 11a and 12a of the small diameter portions 11 and 12. Thereafter, a bond is injected into gaps between the cylindrical tubes 7 and 8 and the cylindrical portion of the resin-coated steel pipe 6 and between the covering ribs 10 and the fitting ribs 5 by means of a dropping pipette or the like for fixing.

Then, in order to form an appropriate pipe framework, the edge of the partitioning body 4 is inserted into the fitting ribs 5 of two resin-coated steel pipes 6.

With the joint 1 constructed as set forth above, the axially extending and mutually communicated slits 9 are formed over the entire length on the side of the reentrant angle of the adjacent two cylindrical tubes 7 and 8. Also, the covering ribs 10 are formed along both sides of the slit 9 over the entire length. Therefore, fabrication process becomes unnecessary. In conjunction therewith, degradation of external appearance due to exposure of the edge of the corner portion of the partitioning body 4 can be successfully avoided.

On the other hand, since the tip end face of the fitting rib 5 is covered by the inwardly bent portion 10a, the external appearance can be further enhanced.

Figure 5:
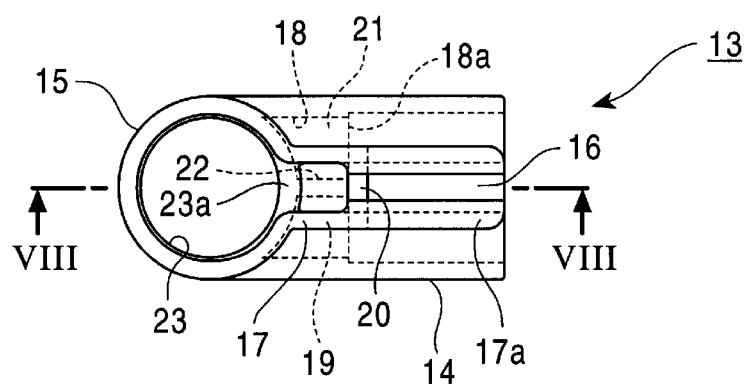
FIG. 5 is a plan view showing the second embodiment of the joint according to the present invention.
Figure 6:
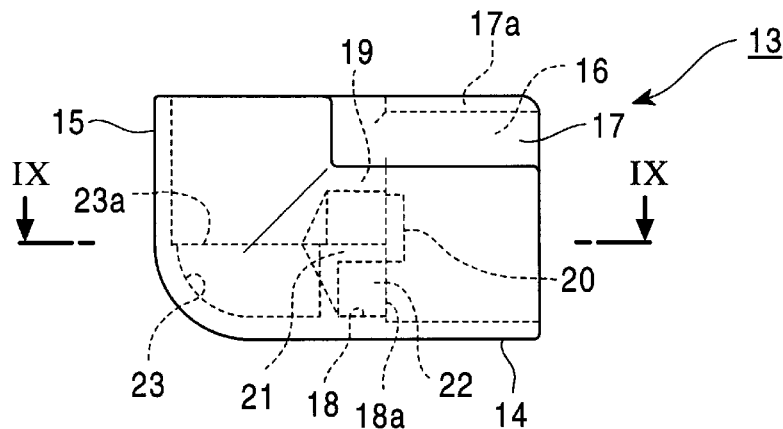
FIG. 6 is a front elevation of the joint of FIG. 5.
Figure 7:
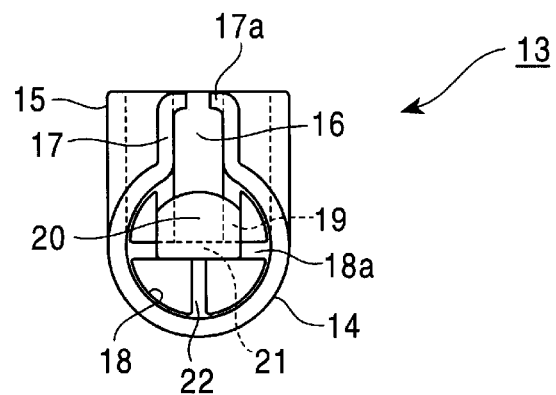
FIG. 7 is a right side view of the joint of FIG. 5.
Figure 8:
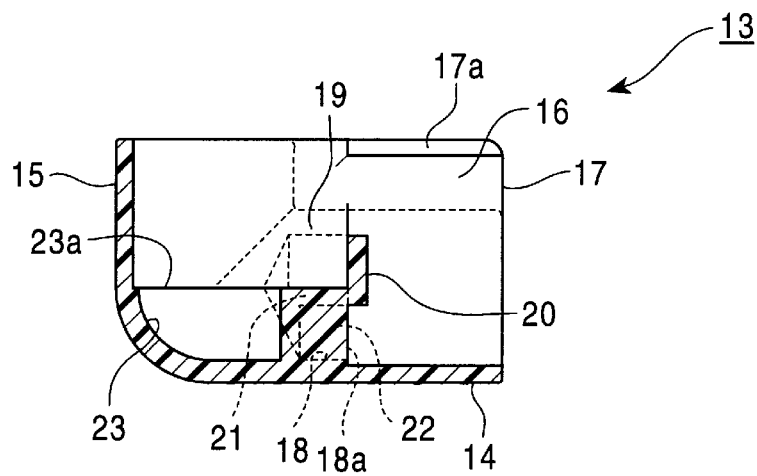
FIG. 8 is a section taken along line VIII—VIII of FIG. 5.
Figure 9:
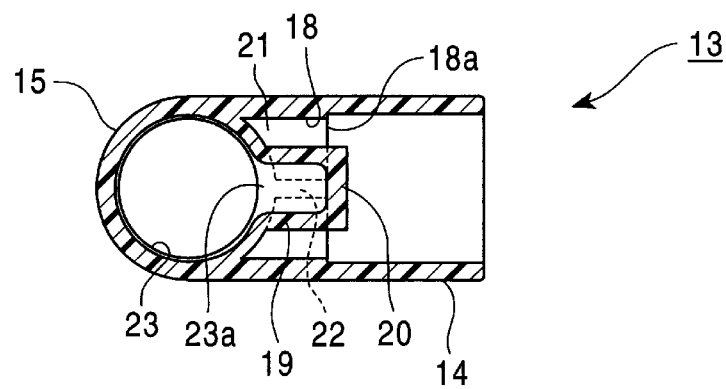
FIG. 9 is a section taken along line IX—IX of FIG. 6.

FIGS. 5, 6, 7, 8 and 9 are a plan view, a front elevation, a right side view, a section taken along line VIII—VIII of FIG. 5 and a section taken along line IX—IX of FIG. 6 showing the second embodiment of the joint according to the present invention.

The joint 13 is designed for perpendicularly joining two resin-coated steel pipes (not shown) respectively having a pair of fitting ribs similar to the former embodiment, with abutting the end face of one resin-coated steel pipe is in contact with outer peripheral surface of the end portion of the other resin-coated steel pipe. The two synthetic resin cylindrical tubes 14 and 15 having mutually different length, into which the cylindrical portions of the resin-coated steel pipes are inserted, are intersectingly connected into an L-shaped configuration via a curved connecting portion. On the reentrant angle sides of both cylindrical tubes 14 and 15, slits 16 are formed over the entire length at a position located on one plane extending across respective axes, are formed. On both cylindrical tubes 14 and 15, covering ribs 17 covering outer side faces of the pair of fitting ribs of the resin-coated steel pipes are formed integrally along both sides over the entire length. On the tip end portion of the covering ribs 17, inwardly bent portions 17a to be fitted over the tip end face of the fitting ribs of the resin-coated steel pipe are formed.

On the other hand, on the side of the intersecting portion (left end in FIG. 6) in one cylindrical tube 14, a small diameter portion 18 is formed with locating a stepped portion 18a, to which the end face of the resin-coated steel pipe abuts, corresponding to the tip end portion of the covering ribs 17 of the other cylindrical tube 15. In conjunction therewith, an auxiliary rib 19 is extended up to the center portion by extending the covering rib 17 of the other cylindrical tube 15. Then, on the side of the opening end of one cylindrical tube 14, the auxiliary rib 19 is connected to a semi-circular reinforcement panel 20 of the size to be accommodated within the resin-coated steel pipe inserted into one cylindrical tube 14. In conjunction therewith, the end portions of the pair of auxiliary ribs 19 are reinforced by a radial reinforcement rib 21 and T-shaped radial reinforcement ribs 22 together with the radial reinforcement rib 21.

Furthermore, on the side of the intersecting portion (lower end in FIG. 6 ) of the other cylindrical tube 15, a small diameter portion 23 is formed with corresponding the stepped portion 23a, to which the end face of the resin-coated steel pipe abuts, with the center portion of one cylindrical tube 14. Also, the end face on the side of the opening end (upper end in FIG. 6) of the other cylindrical tube 15 is formed in flush with the tip end face of the inwardly bent portion 17a of the covering rib 17 of the cylindrical tube 14.

The joint 13 is designed for connecting the resin-coated steel pipes substantially similar to the first embodiment. By the shown construction of the joint 13, in addition to the functions and effect achieved by the former embodiment, since the side of the intersecting portion in one cylindrical tube 14 is reinforced by the auxiliary rib 19 or the reinforcement panel 20 or the like, the mechanical strength can be attained.

Furthermore, since the end face on the opening end side of the other cylindrical tube 15 is located in flush with the tip end face of the inwardly bent portion 17a of the covering rib 17 of one cylindrical tube 14 and since the intersecting portion forms a part of the other cylindrical tube 15, the joint 13 can be made compact and light weight.

Figure 10:
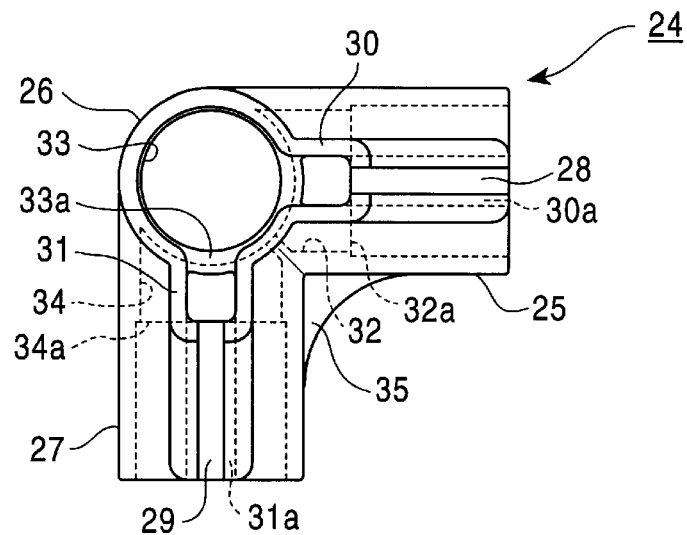
FIG. 10 is a plan view showing the third embodiment of the joint according to the present invention.
Figure 11:
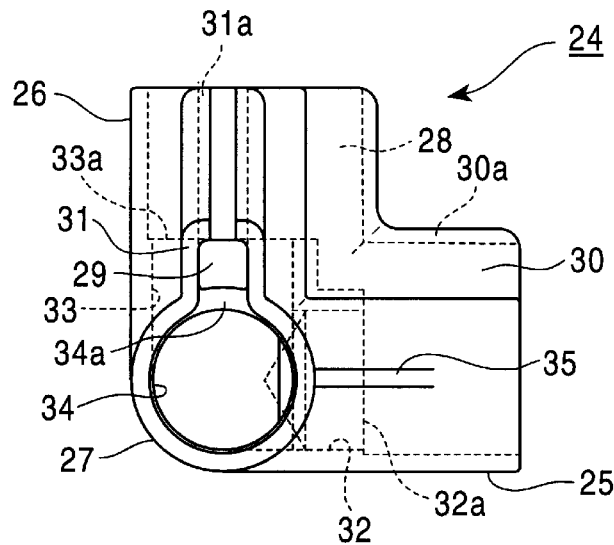
FIG. 11 is a front elevation of the joint of FIG. 10.
Figure 12:
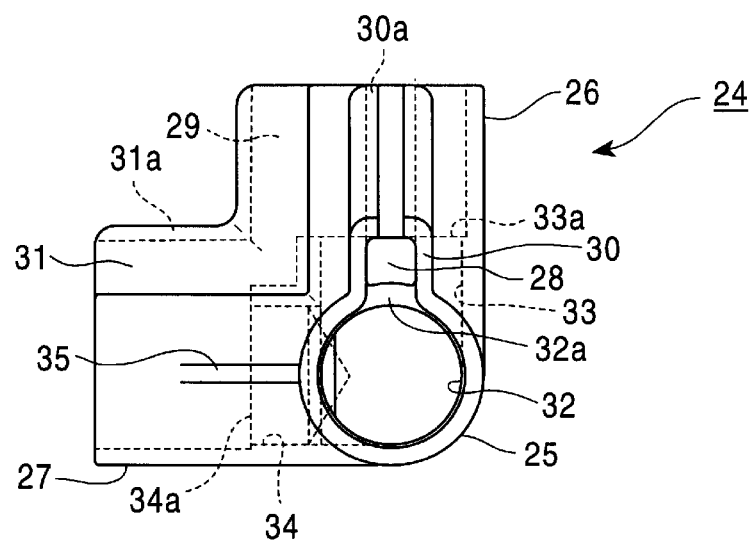
FIG. 12 is a right side view of the joint of FIG. 10.

FIGS. 10, 11 and 12 are plane view, front elevation and right side view of the third embodiment of the joint according to the present invention.

A joint 24 designed by connecting two resin-coated steel pipes (not shown), each of which is provided with a pair of fitting ribs and one resin-coated steel pipe (not shown) provided with two pairs of fitting ribs with angular offset of 90° between each pair of the fitting ribs, perpendicularly in orthogonal three directions with abutting respective ends. Synthetic resin cylindrical tubes 25, 26 and 27 having equal length, into which cylindrical portions of the resin-coated steel pipes are inserted, are intersectingly connected in three directions via curved joining portion. On the reentrant angle sides of the adjacent first and second cylindrical tubes 25 and 26 and between adjacent second and third cylindrical tubes 26 and 27, slits 28 and 29 permitting the pair of fitting ribs of the resin-coated steel pipe to project therethrough are formed over the entire length at a position located in flush with one plane extending across axes of adjacent cylindrical tubes. On the adjacent cylindrical tubes 25, 26 and 27, covering ribs 30 and 31 covering outer side surfaces of the pair of fitting ribs of the resin-coated steel pipes are formed integrally along both sides of the slits 28 and 29 over the entire length. On the tip ends of respective covering ribs 30 and 31, inwardly bent portions 30a and 31a are formed for covering the tip end portions of the fitting ribs of the resin-coated steel pipe.

On the other hand, on the side of the intersecting portion (left end in FIG. 11) in the first cylindrical tube 25, a small diameter portion 32 is formed with locating a stepped portion 32a, to which the end face of the resin-coated steel pipe abuts, corresponding to the tip end portion of the covering ribs 30 of the second cylindrical tube 26. On the side of the intersecting portion (lower end in FIG. 11) in the second cylindrical tube 26, a small diameter portion 33 is formed with locating a stepped portion 33a, to which the end face of the resin-coated steel pipe provided with two pairs of the fitting ribs abuts, corresponding to the tip end portion of the covering ribs 30 of the first cylindrical tube 25. Similarly, on the side of the intersecting portion (right end in FIG. 12) in the third cylindrical tube 27, a small diameter portion 34 is formed with locating a stepped portion 34a, to which the end face of the resin-coated steel pipe abuts, corresponding to the tip end portion of the covering ribs 31 of the second cylindrical tube 26.

In FIGS. 10, 11 and 12, the reference numeral 35 denotes a reinforcement rib reinforcing a reentrant angle of the first and third cylindrical tubes 25 and 27.

The foregoing joint 24 connects the resin-coated steel pipe in similar manner as that of the first embodiment, in orthogonal three directions. With the joint 24 constructed as set forth above, the similar functions and effects to those of the first embodiment can be attained.

Figure 13:
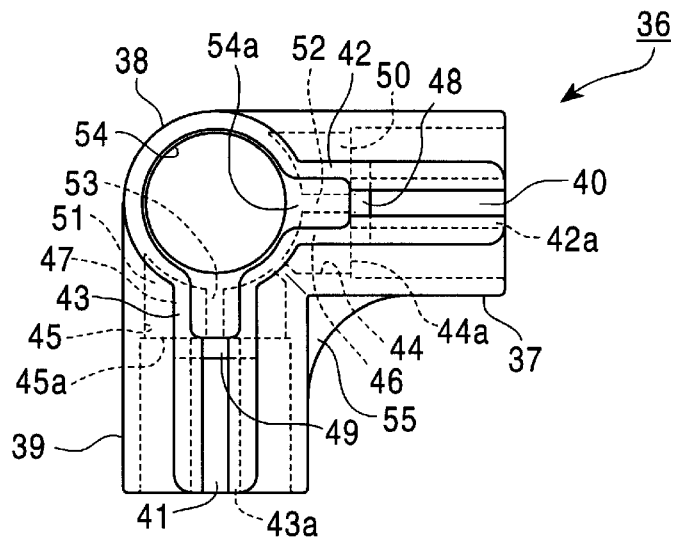
FIG. 13 is a plan view showing the fourth embodiment of the joint according to the present invention.
Figure 14:
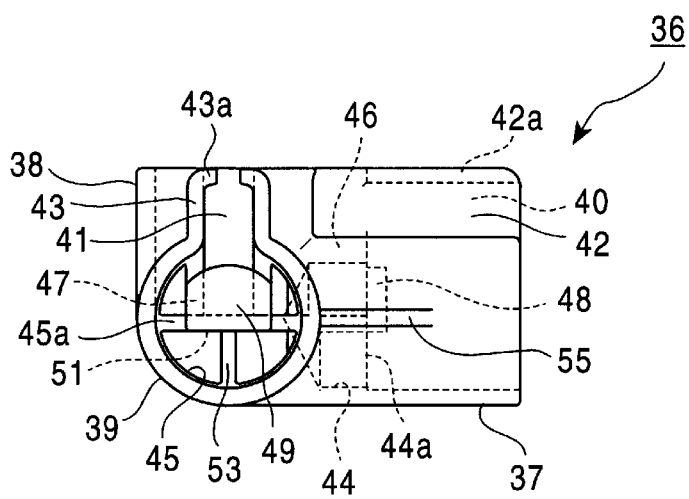
FIG. 14 is a front elevation of the joint of FIG. 13.
Figure 15:
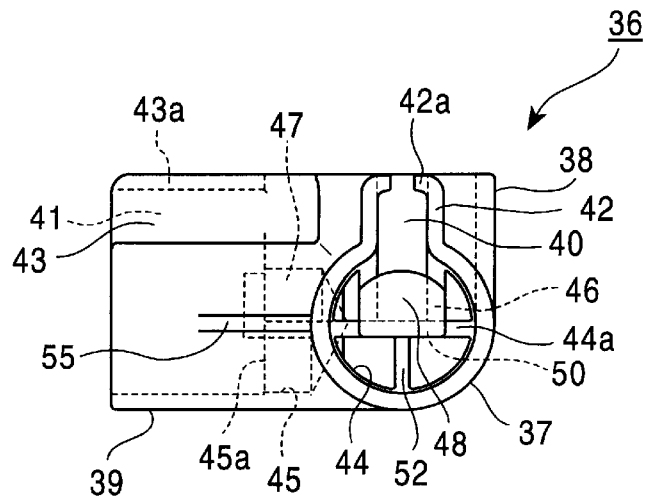
FIG. 15 is a right side view of the joint of FIG. 13.

FIGS. 13, 14 and 15 are plane view, front elevation and right side view of the fourth embodiment of the joint according to the present invention.

A joint 36 is designed for connecting two resin-coated steel pipes (not shown), each of which is provided with a pair of fitting ribs and one resin-coated steel pipe (not shown) provided with two pairs of fitting ribs with angular offset of 90° between each pair of the fitting ribs, perpendicularly in orthogonal three directions with abutting respective ends. Three synthetic resin cylindrical tubes 37, 38 and 39 having different lengths, in such a manner that the end faces of the first and third cylindrical tubes 37 and 39 having equal length are intersectingly connected to the outer peripheral surface of end portion of the second cylindrical tube 38 having shorter length than the first and third cylindrical tubes 37 and 39 via curved joint portion in orthogonal three directions. On the reentrant angle sides of the adjacent first and second cylindrical tubes 37 and 38 and between adjacent second and third cylindrical tubes 38 and 39, slits 40 and 41 permitting the pair of fitting ribs of the resin-coated steel pipe to project therethrough are formed over the entire length at a position located in flush with one plane extending across axes of adjacent cylindrical tubes. On the adjacent cylindrical tubes 37, 38 and 39, covering ribs 42 and 43 covering outer side surfaces of the pair of fitting ribs of the resin-coated steel pipes are formed integrally along both sides of the slits 40 and 41 over the entire length. On the tip ends of respective covering ribs 42 and 43, inwardly bent portions 42a and 43a are formed for covering the tip end portions of the fitting ribs of the resin-coated steel pipe.

On the other hand, on the intersecting portion side (left end in FIG. 14 and right end in FIG. 15) in the first and third cylindrical tubes 37 and 39, small diameter portions 44 and 45 are formed with locating stepped portions 44a and 45a, to which the end faces of the resin-coated steel pipes abut, corresponding to tip end portions of the covering ribs 42 and 43 of the second cylindrical tube 38. Auxiliary ribs 46 and 47 formed by extending the covering ribs 42 and 43 of the second cylindrical tube 38 is extended to the center portion. Then, the auxiliary ribs 46 and 47, on the opening end side (right end in FIG. 14 and the left end in FIG. 15) of the first and third cylindrical tubes 37 and 39, are connected with semi-circular reinforcement plates 48 and 49 of the size to be accommodated within the resin-coated steel pipe to be inserted into the cylindrical tubes 37 and 38. The end portions of a pair of the auxiliary ribs 46 and 47 are reinforced by the radial reinforcement ribs 50 and 51, and T-shaped radial reinforcement ribs 52 and 53.

On the other hand, on the side of the intersecting portion (lower end in FIG. 14) in the second cylindrical tube 38, a small diameter portion 54 is formed with locating a stepped portion 54a, to which the end face of the resin-coated steel pipe having two pairs of the fitting ribs abuts, corresponding to the center portion of the first and third cylindrical tubes 37 and 39, to make the intersecting portion as a part of the second cylindrical portion 38. The end face on the side of the opening end (upper end in FIG. 14) of the second cylindrical tube 38 is formed in flushwith the tip end faces of the inwardly bent portions 42a and 43a of the covering ribs 42 and 43 of the first and third cylindrical tubes 37 and 39.

In FIGS. 13, 14 and 15, the reference numeral 55 denotes a reinforcement rib reinforcing the reentrant angle of the first and third cylindrical tubes 37 and 39.

The foregoing joint 36 connects the resin-coated steel pipe in similar manner as that of the first embodiment, in orthogonal three directions. With the joint 36 constructed as set forth above, the similar functions and effects to those of the second embodiment can be attained.

Figure 16:
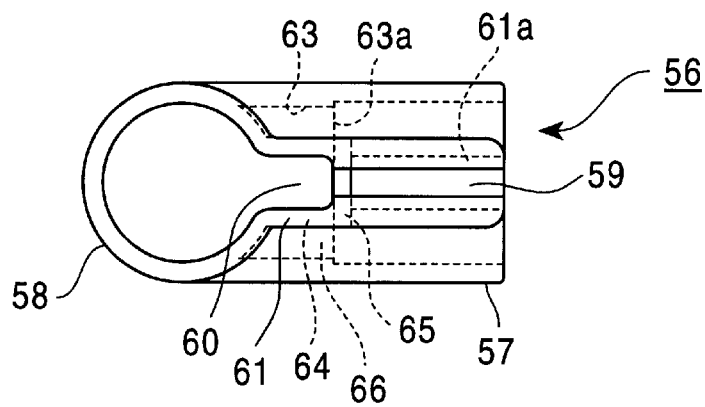
FIG. 16 is a plan view showing the fifth embodiment of the joint according to the present invention.
Figure 17:
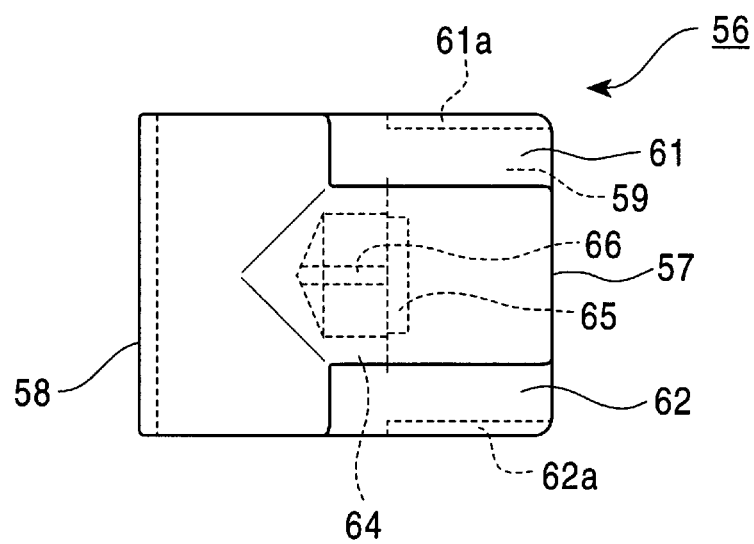
FIG. 17 is a front elevation of the joint of FIG. 16.
Figure 18:
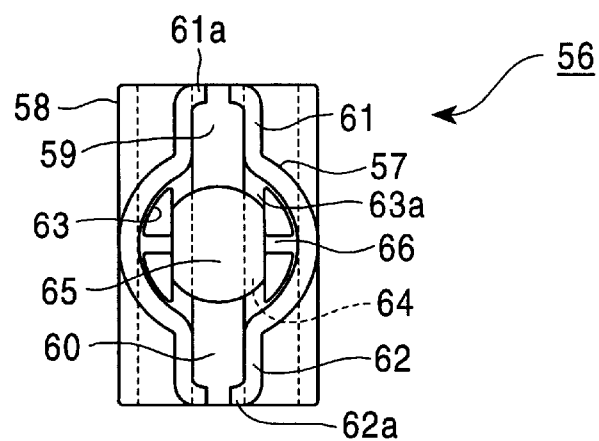
FIG. 18 is a right side view of the joint of FIG. 16.

FIGS. 16, 17 and 18 are respectively a plan view, a front elevation and a right side view of the fifth embodiment of the joint according to the present invention.

The joint 56 is designed for connecting a resin-coated steel pipe (not shown) provided with two pairs of fitting ribs with angular offset of 180° and a resin-coated steel pipe (not shown) provided with one pair of fitting ribs similar to those in the former embodiments, in a T-shaped fashion by abutting the end face of the former onto the outer peripheral surface of the latter. Two synthetic resin cylindrical tubes 57 and 58 having mutually different lengths, into which the cylindrical portions of the resin-coated steel pipes are inserted, are intersectingly jointed into T-shaped configuration so that the end face of the cylindrical tube 57 having shorter length abuts on the outer peripheral surface of the intermediate portion of the other cylindrical tube 58 having longer length. On two reentrant angle side of both cylindrical tubes 57 and 58, slits 59 and 60 permitting two pairs of fitting ribs to project therethrough are formed over the entire length at a position on one plane extending across axes of both cylindrical tubes. The covering ribs 61 and 62 covering the outer side surface of the pairs of the fitting ribs of the resin-coated steel pipes, are formed integrally with both cylindrical tubes 57 and 58 along both sides of respective slits 59 and 60. The tip ends of the covering ribs 61 and 62 are formed with inwardly bent portions 61a and 62a covering over the tip end face of the fitting ribs of the resin-coated steel pipe.

On the other hand, on the side of the intersecting portion (left end in FIG. 17) in one cylindrical tube 57, a small diameter portion 63 is formed with locating a stepped portion 63a, to which the end face of the resin-coated steel pipe having two pairs of the fitting ribs abuts, corresponding to the tip end portion of the covering ribs 61 and 62 of the other cylindrical tube 58. An auxiliary rib 64 is formed by extending the covering ribs 61 and 62 of the other cylindrical tube 58. Then, the auxiliary rib 64 on opening end side (right end in FIG. 17) of one cylindrical tube 57 is connected to a substantially circular reinforcement plate 65 of the size to be accommodated within the resin-coated steel pipe having two pairs of the fitting ribs and to be inserted into one cylindrical tube 57. The outer side of the intermediate portion of a pair of reinforcement ribs 64 are reinforced by radial reinforcement rib 66.

The joint 56 is adapted to connect two resin-coated steel pipes in T-shaped configuration by inserting the resin-coated steel pipes provided with the two pairs of fitting ribs into one cylindrical tube 57 with abutting the end face thereof onto the stepped portion 63a of the small diameter portion 63, inserting the resin-coated steel pipe provided with the one pair of fitting ribs into the other cylindrical tube 58, and thereafter, injecting a bond between the cylindrical tubes 57 and 58 and the cylindrical portions of respective resin-coated steel pipes and between the covering ribs 61 and 62 and the fitting ribs. With the joint 56 of the construction set forth above, substantially the same functions and effects as those achieved by the second embodiment, can be attained.

Figure 19:
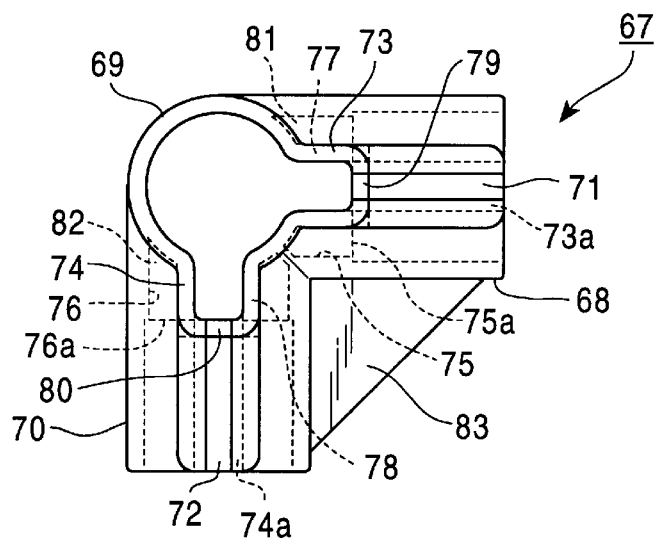
FIG. 19 is a plan view showing the sixth embodiment of the joint according to the present invention.
Figure 20:
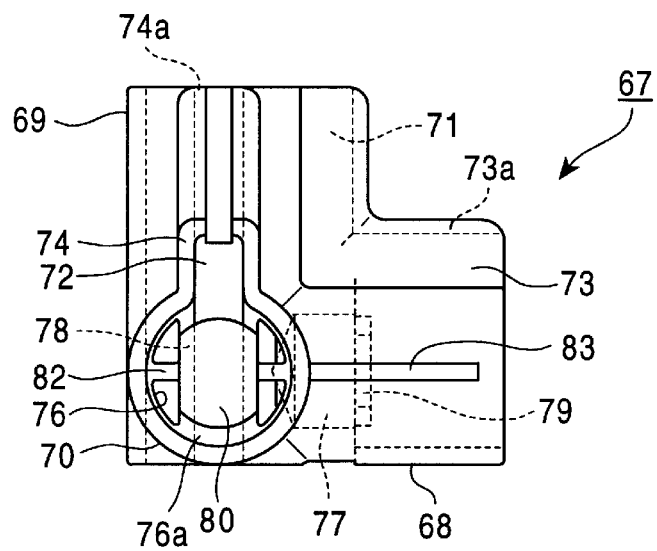
FIG. 20 is a front elevation of the joint of FIG. 19.
Figure 21:
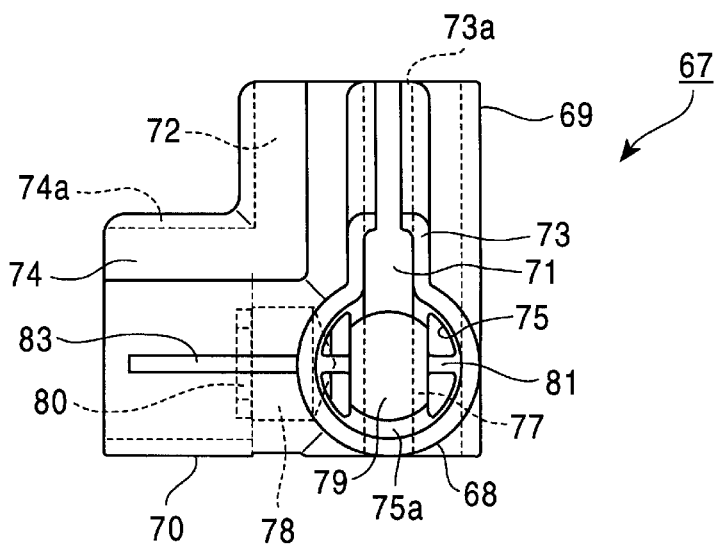
FIG. 21 is a right side view of the joint of FIG. 19.

FIGS. 19, 20 and 21 are plane view, front elevation and right side view of the sixth embodiment of the joint according to the present invention.

A joint 67 is designed by connecting two resin-coated steel pipes (not shown), each of which is provided with a pair of fitting ribs and one resin-coated steel pipe (not shown) provided with two pairs of fitting ribs with angular offset of 90° between each pair of the fitting ribs, perpendicularly in orthogonal three directions with abutting respective ends. Synthetic resin cylindrical tubes 68, 69 and 70 having different length, in such a manner that the end faces of the first and third cylindrical tubes 68 and 70 having equal length are intersectingly connected to the outer peripheral surface of end portion of the second cylindrical tube 69 having longer length than the first and third cylindrical tubes 68 and 70. On the reentrant angle sides of the adjacent first and second cylindrical tubes 68 and 69 and between adjacent second and third cylindrical tubes 69 and 70, slits 71 and 72 permitting the pair of fitting ribs of the resin-coated steel pipe to project therethrough are formed over the entire length at a position located in flush with one plane extending across axes of adjacent cylindrical tubes. On the adjacent cylindrical tubes 68, 69 and 70, covering ribs 73 and 74 covering outer side surfaces of the pair of fitting rib of the resin-coated steel pipes are formed integrally along both sides of the slits 71 and 72 over the entire length. On the tip ends of respective covering ribs 73 and 74, inwardly bent portions 73a and 74a are formed for covering the tip end portions of the fitting ribs of the resin-coated steel pipe.

On the other hand, on the side of the intersecting portion (lower end in FIG. 20 and right end of FIG. 21) in the first and third cylindrical tubes 68 and 70, small diameter portions 75 and 76 are formed with locating stepped portions 75a and 76a, to which the end faces of the resin-coated steel pipes abut, corresponding to the tip end portions of the covering ribs 73 and 74 of the second cylindrical tube 69. Auxiliary ribs 77 and 78 are formed by extending covering ribs 73 and 74 of the second cylindrical tube 69 in a form connected with the inner peripheral surfaces of the small diameter portions 75 and 76. Then, respective pairs of the auxiliary ribs 77 and 78 on opening end side (right end in FIG. 20 and left end in FIG. 21) of first and third cylindrical tubes 68 and 70 are connected to substantially circular reinforcement plates 79 and 80 of the size to be accommodated within the resin-coated steel pipe having one pairs of the fitting ribs. The outer side of the intermediate portion of two pairs of auxiliary ribs 77 and 78 are reinforced by radial reinforcement ribs 81 and 82.

In FIGS. 19, 20 and 21, the reference numeral 83 is a reinforcement rib reinforcing the reentrant angle of the first and third cylindrical tubes 68 and 70.

The joint 67 is adapted to connect three resin-coated steel pipes in three orthogonal directions by inserting the resin-coated steel pipes provided with the one pairs of fitting ribs into first and third cylindrical tubes 68 and 70 with abutting the end faces thereof onto the stepped portions 75a and 76a of the small diameter portions 75 and 76, inserting the resin-coated steel pipe provided with the two pairs of fitting ribs into the second cylindrical tube 69, and thereafter, injecting a bond between the cylindrical tubes 68, 69 and 70 and the cylindrical portions of respective resin-coated steel pipes and between the covering ribs 73 and 74 and the fitting ribs. With the joint 67 of the construction set forth above, substantially the same functions and effects as those achieved by the second embodiment, can be attained.

Figure 22:
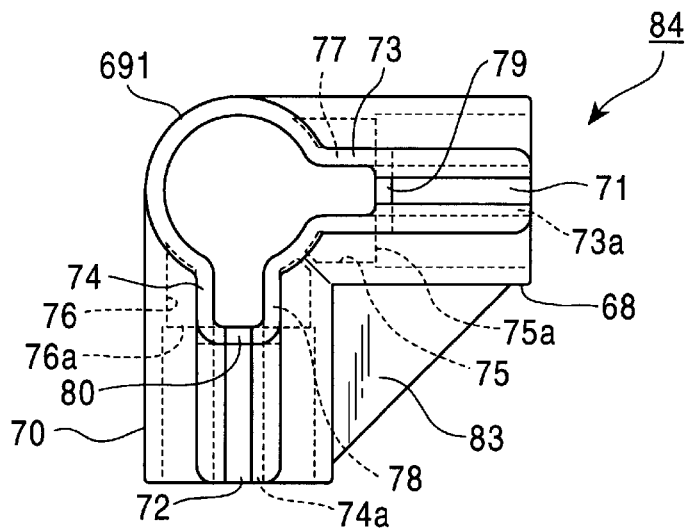
FIG. 22 is a plan view showing the seventh embodiment of the joint according to the present invention.
Figure 23:
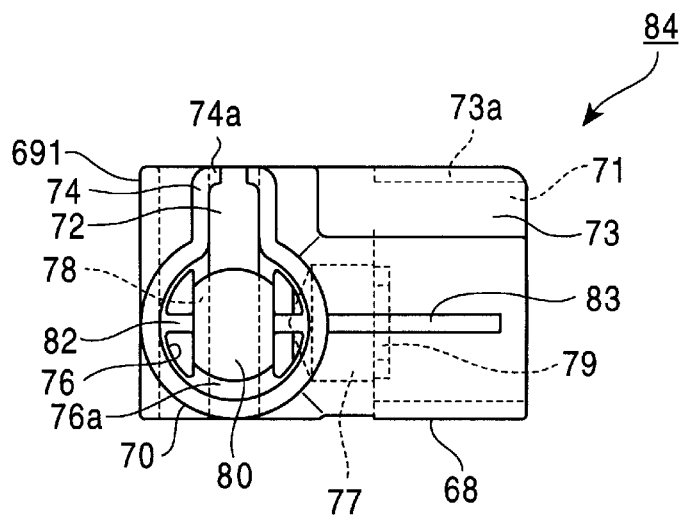
FIG. 23 is a front elevation of the joint of FIG. 22.
Figure 24:
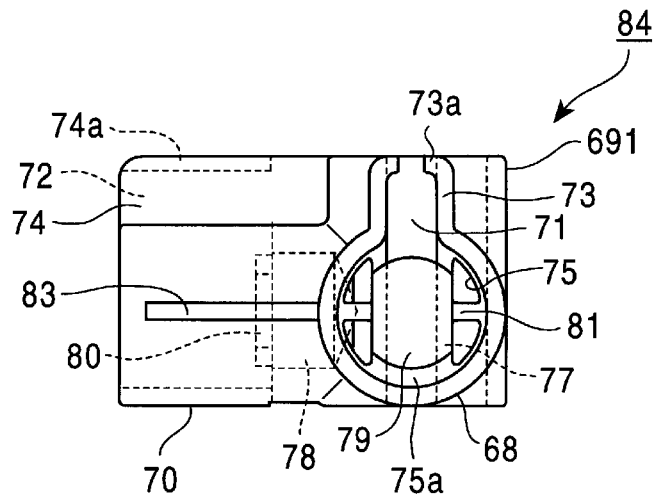
FIG. 24 is a right side view of the joint of FIG. 22.

FIGS. 22, 23 and 24 are a plan view, a front elevation and a right side view of the seventh embodiment the joint according to the present invention.

The joint 84 is formed by forming the second cylindrical tube 691 to be shorter than the first and third cylindrical tubes 68 and 70. The end face on side of the opening end (upper end in FIG. 23) of the second cylindrical tube 691 is formed in flush with the tip end face of the inwardly bent portions 73a and 74a of the covering ribs 73 and 74 of the first and third cylindrical tubes 68 and 70.

Other construction, function and effects are the same as that of the sixth embodiment. It should be noted that like elements to those of the sixth embodiment will be identified by like reference numerals and detailed description therefore will be neglected for simplification of disclosure with avoiding redundant disclosure in order to facilitate clear understanding of the present invention.

Figure 25:
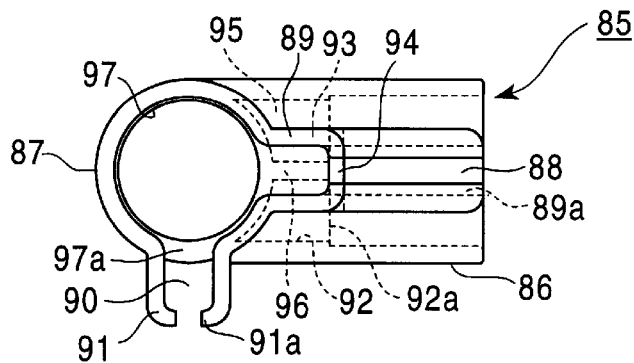
FIG. 25 is a plan view showing the eighth embodiment of the joint according to the present invention.
Figure 26:
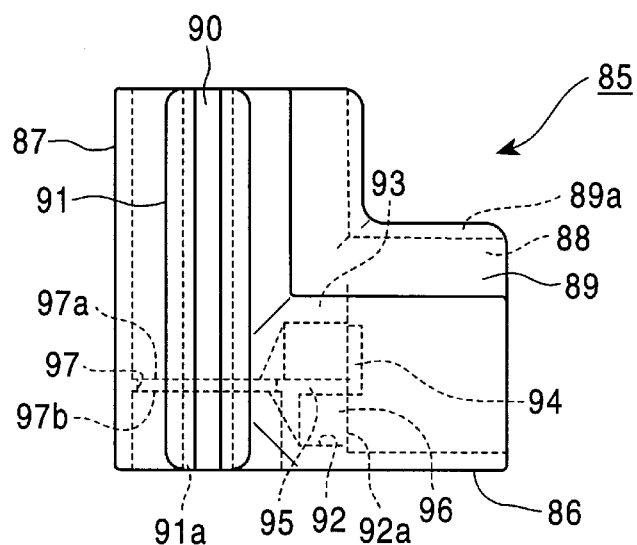
FIG. 26 is a front elevation of the joint of FIG. 25.
Figure 27:
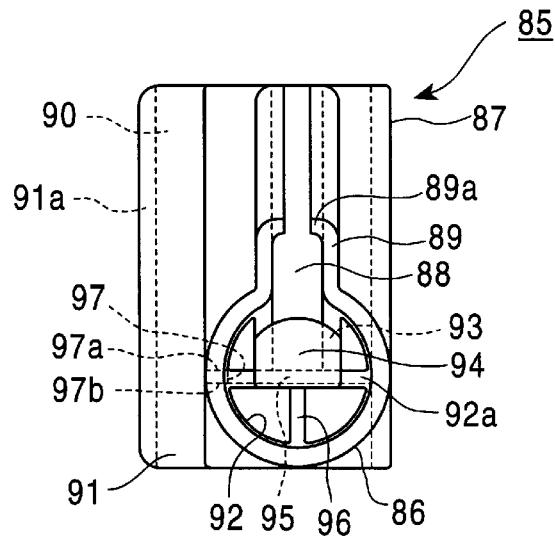
FIG. 27 is a right side view of the joint of FIG. 25.

FIGS. 25, 26 and 27 are respectively a plan view, a front elevation and a right side view of the eighth embodiment of the joint according to the present invention.

The joint 85 is designed for connecting an end face of a resin-coated steel pipe (not shown) provided with one pair of fitting ribs with an outer peripheral surface of a connecting portion between a resin-coated steel pipe (not shown) provided with two pairs of fitting ribs with angular offset of 90° and a resin-coated steel pipe (not shown) provided with a pair of the fitting ribs, in a T-shaped fashion. Two synthetic resin cylindrical tubes 86 and 87 having mutually different lengths, into which the cylindrical portions of the resin-coated steel pipes are inserted, are intersectingly jointed into L-shaped configuration so that the end face of the cylindrical tube 86 having shorter length abuts on the outer peripheral surface of the end portion of the other cylindrical tube 87 having longer length. On two reentrant angle side of both cylindrical tubes 86 and 87, slits 88 permitting two pairs of fitting ribs to project therethrough are formed over the entire length at a position on one plane extending across axes of both cylindrical tubes. The covering ribs 89 covering the outer side surface of the pairs of the fitting ribs of the resin-coated steel pipes, are formed integrally with both cylindrical tubes 86 and 87 along both sides of respective slits 88. The tip ends of the covering ribs 89 are formed with inwardly bent portions 89a covering over the tip end face of the fitting ribs of the resin-coated steel pipe.

On the other hand, on the other cylindrical tube 87, an axially extending slit 90 permitting a pair of fitting ribs of the resin-coated steel pipe to project therethrough is formed over the entire length with angular offset of 90° from the slit 88. Also, covering ribs 91 covering the outer side surface of the pair of fitting ribs of the resin-coated steel pipe are integrally formed long both sides of the slits over the entire length. On the tip end portion of the covering rib 91, an inwardly bent portion 91a covering the tip end face of the fitting rib of the resin-coated steel pipe is formed.

On the other hand, on the side of the intersecting portion (left end in FIG. 26) in one cylindrical tube 86, a small diameter portion 92 is formed with locating a stepped portion 92a, to which the end face of the resin-coated steel pipe abuts, corresponding to the tip end portion of the covering ribs 89 the other cylindrical tube 87. An auxiliary rib 93 is formed by extending the covering ribs 89 of the other cylindrical tube 87 and is extended to the center portion. Then, a pair of the auxiliary ribs 93 on opening end side (right end in FIG. 26) of one cylindrical tube 86 is connected to a substantially semi-circular reinforcement plate 94 of the size to be accommodated within the resin-coated steel pipe. The end portion of a pair of auxiliary ribs 96 are reinforced by radial reinforcement rib 95 and T-shaped radial reinforcement rib 96 in cooperation with the former.

Furthermore, on the side of the intersecting portion (lower end in FIG. 26) in the other cylindrical tube 87, a ring-shaped projection 97, to which the end faces of the resin-coated steel pipe provided with two pairs of the fitting ribs and resin-coated steel pipe provided with one pair of fitting ribs and connected to the former are abut, is formed at a position corresponding to the center portion of one cylindrical tube 86.

The joint 85 is adapted to connect three resin-coated steel pipes in T-shaped configuration by inserting the resin-coated steel pipes provided with the one pairs of fitting ribs into one cylindrical tube 86 with abutting the end face thereof onto the stepped portion 92a of the small diameter portion 92, inserting the resin-coated steel pipe provided with the two pairs of fitting ribs into one side (upper side in FIG. 26) of the other cylindrical tube 87 with abutting the end face thereof with one stepped portion 97a of the projection 97, abutting the end face of the resin-coated steel pipe on the other side with the other stepped portion 97b of the projection 97, and thereafter, injecting a bond between the cylindrical tubes 86 and 87 and the cylindrical portions of respective resin-coated steel pipes and between the covering ribs 89 and 91 and the fitting ribs. With the joint 85 of the construction set forth above, substantially the same functions and effects as those achieved by the second embodiment, can be attained.

Figure 28:
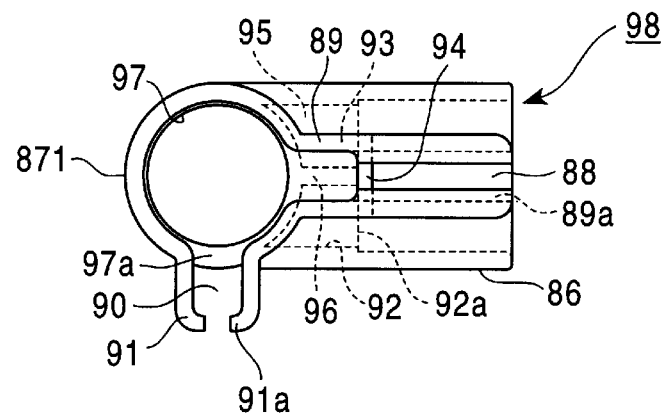
FIG. 28 is a plan view showing the ninth embodiment of the joint according to the present invention.
Figure 29:
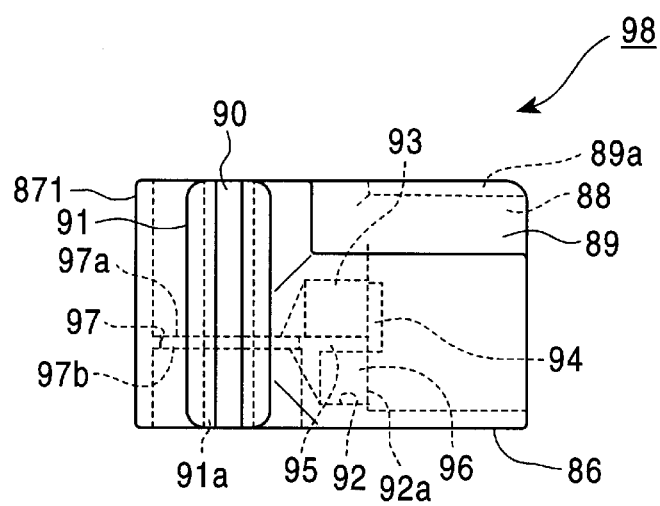
FIG. 29 is a front elevation of the joint of FIG. 28.
Figure 30:
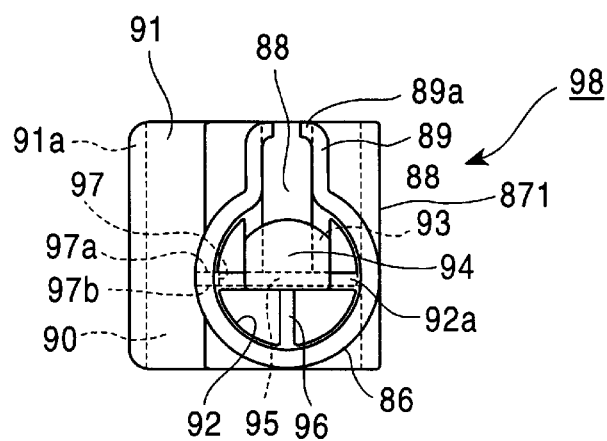
FIG. 30 is a right side view of the joint of FIG. 28.

FIGS. 28, 29 and 30 are respectively a plan view, a front elevation and a right side view of the ninth embodiment of the joint according to the present invention.

The joint 98 is designed to make the other cylindrical tube 871 shorter than the other cylindrical tube 87 of the joint 85 in the eighth embodiment, and the end face of one end thereof (upper end in FIG. 29) is formed in flush with the tip end face of the inwardly bent portion 89a of the covering rib 89 of one cylindrical tube 86.

Other construction, function and effects are the same as that of the eighth embodiment. It should be noted that like elements to those of the sixth embodiment will be identified by like reference numerals and detailed description therefore will be neglected for simplification of disclosure with avoiding redundant disclosure in order to facilitate clear understanding of the present invention.

Figure 31:
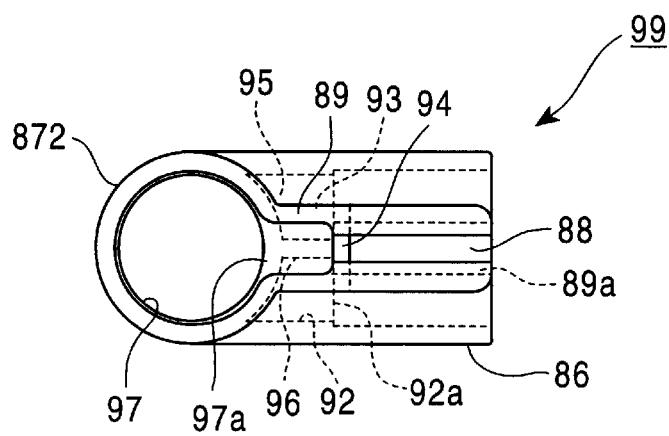
FIG. 31 is a plan view showing the tenth embodiment of the joint according to the present invention.
Figure 32:
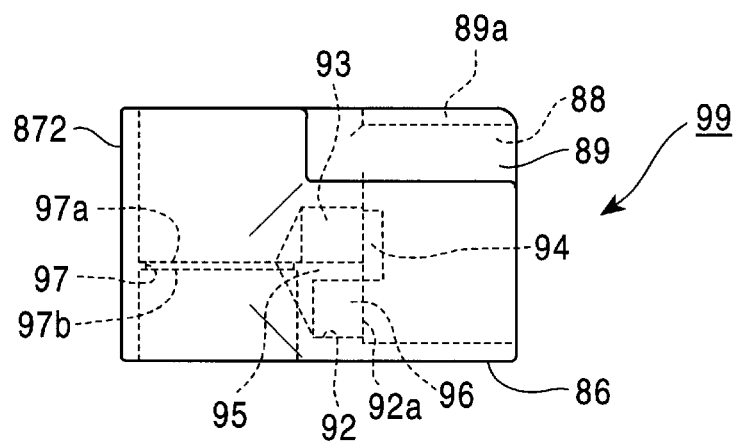
FIG. 32 is a front elevation of the joint of FIG. 31.
Figure 33:
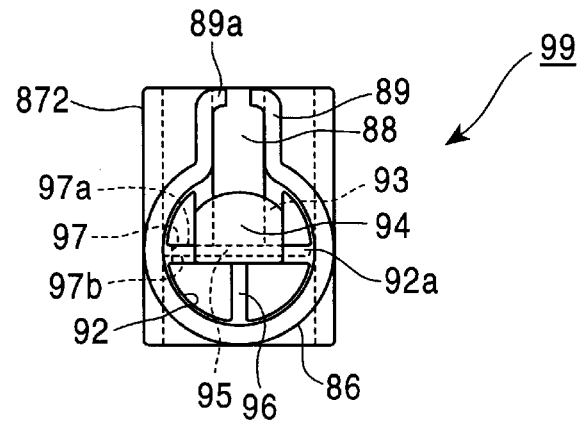
FIG. 33 is a right side view of the joint of FIG. 31.

FIGS. 31, 32 and 33 are respectively a plan view, a front elevation and a right side view of the tenth embodiment of the joint according to the present invention.

The joint 99 is designed by forming the other cylindrical tube 872 without forming the slit 90 and the covering ribs 91 formed in the other cylindrical tube 871 in the ninth embodiment.

Other construction, function and effects are the same as that of the sixth embodiment. It should be noted that like elements to those of the sixth embodiment will be identified by like reference numerals and detailed description therefore will be neglected for simplification of disclosure with avoiding redundant disclosure in order to facilitate clear understanding of the present invention.

As set forth above, with the joint according to the present invention, the axially extending slits communicating the reentrant sides of two adjacent cylindrical tubes are formed over the entire length, and the covering ribs are formed on both sides of the overall length of the slits. Thus, fabrication process becomes unnecessary. In conjunction therewith, the edge of the corner portion of the partitioning body may not be exposed to avoid degradation of the external appearance.

In addition, since the intersecting portion side of one cylindrical tube is reinforced by the reinforcement rib and the reinforcement plate, mechanical strength can be improved.

Also, by forming the reinforcement plate in a size to be accommodated within the resin-coated steel pipe, insertion length of the resin-coated steel pipe into the cylindrical tube can be expanded for the corresponding length to increase strength of connection therebetween.

Furthermore, since the tip end face of the fitting ribs are covered with the inwardly bent portion of the covering ribs, external appearance can be further enhanced.

In addition, by locating the end face on the opening end side of the other cylindrical tube in flush with the tip end face of the covering ribs or the inwardly bent portion, the joint can be made compact and light weight.

Figure 34:
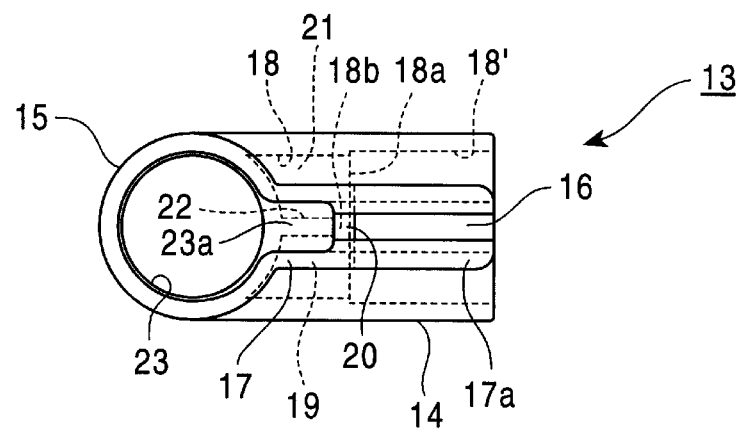
FIG. 34 is a plan view of a modification of the foregoing second embodiment of the joint according to the present invention.
Figure 35:
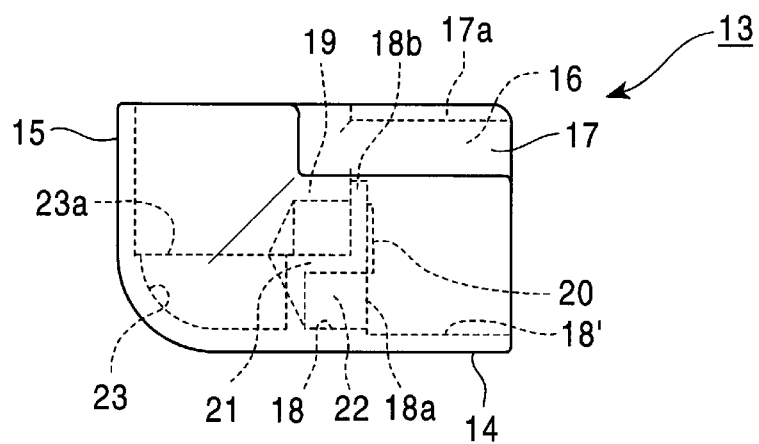
FIG. 35 is a front elevation of a modification of the foregoing second embodiment of the joint according to the present invention.
Figure 36:
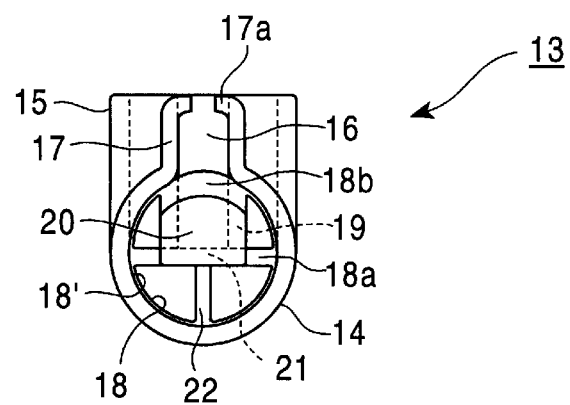
FIG. 36 is a right side elevation of a modification of the foregoing second embodiment of the joint according to the present invention.
Figure 37:
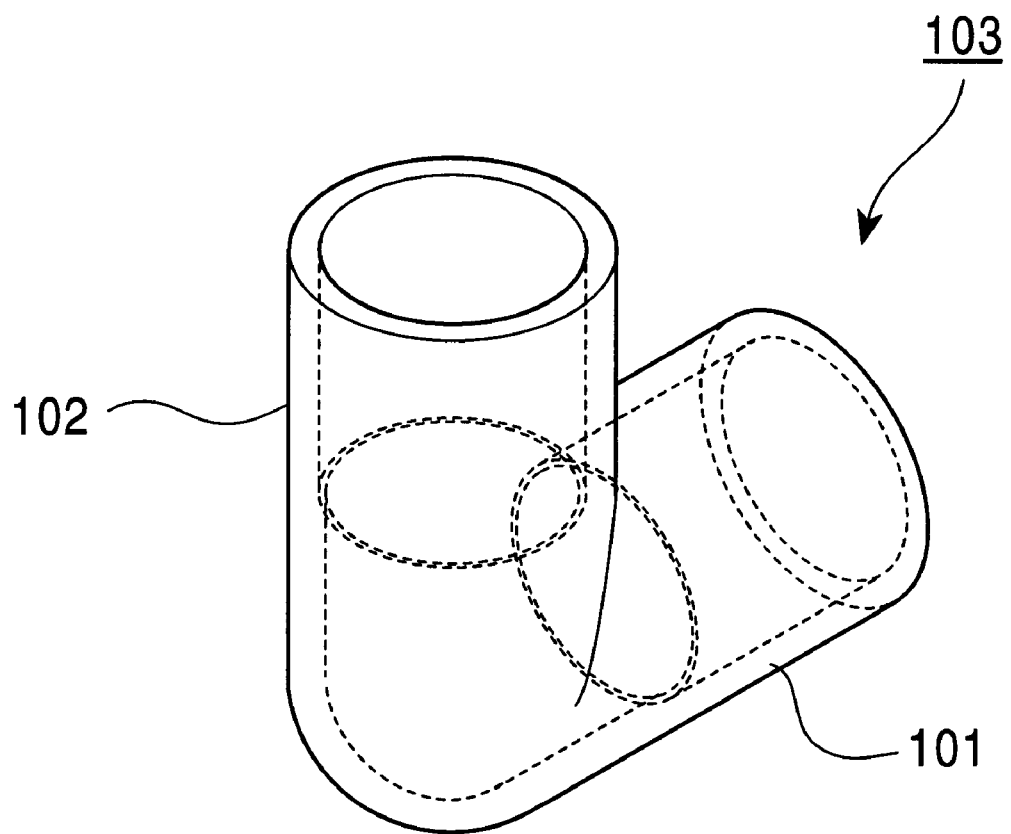
FIG. 37 is a perspective view of the conventional joint.
Figure 38:
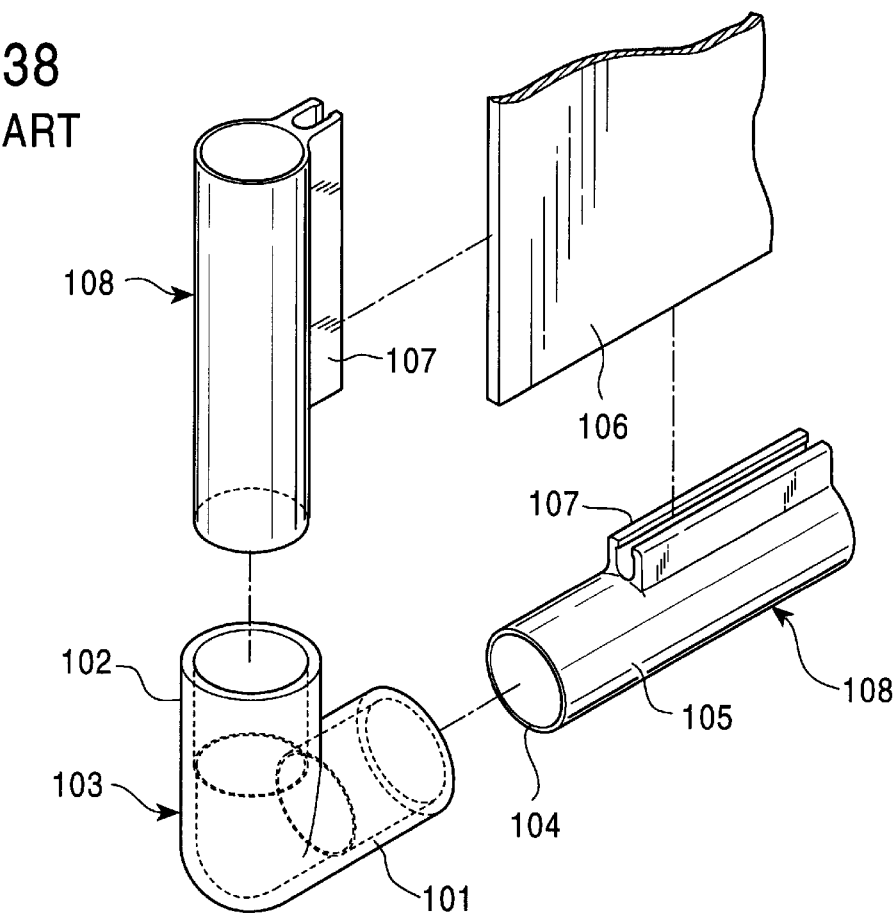
FIG. 38 is a partially exploded perspective of a pipe framework assembled employing the joint of FIG. 37.
Figure 39:
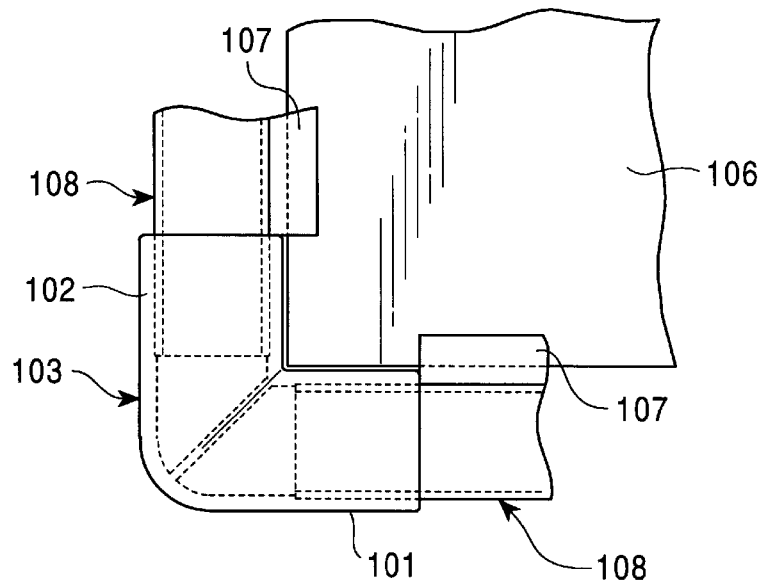
FIG. 39 is a partial plan view of the pipe framework assembled employing the joint of FIG. 37.
Figure 40:
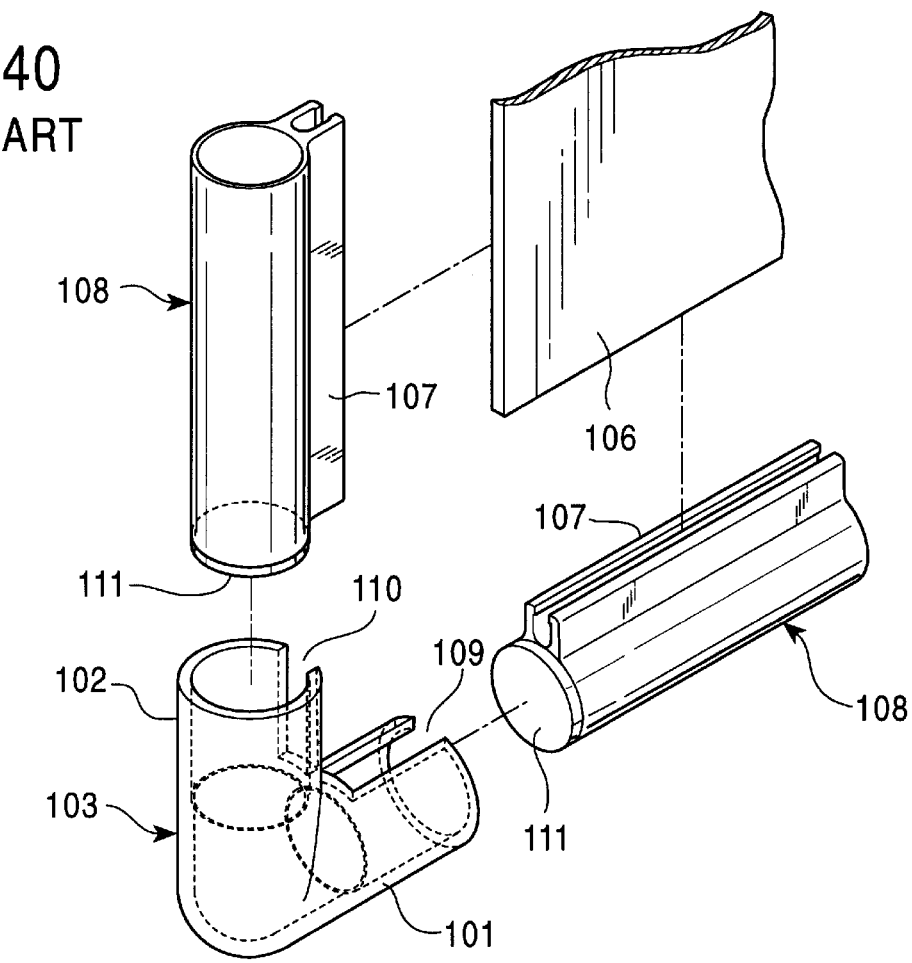
FIG. 40 is a partially exploded perspective view of the pipe framework assembled employing another conventional joint.
Figure 41:
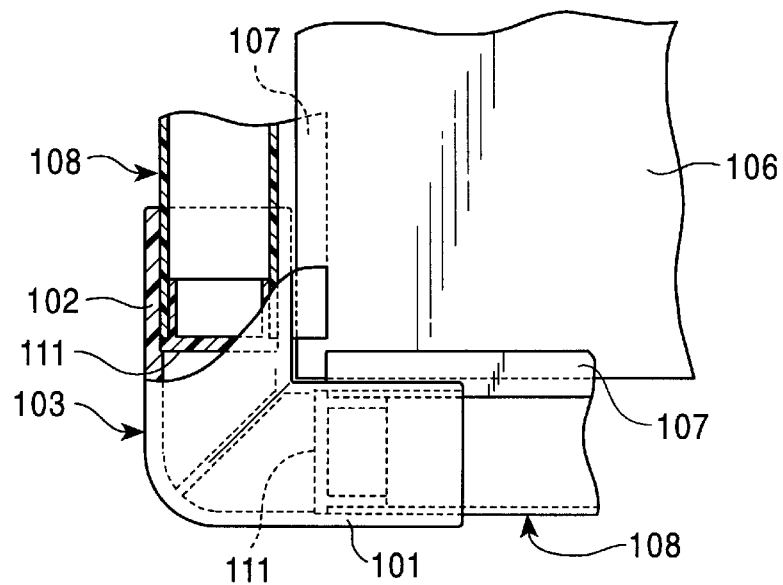
FIG. 41 is a partial plan view of the pipe framework assembled employing a further conventional joint.
Figure 42:
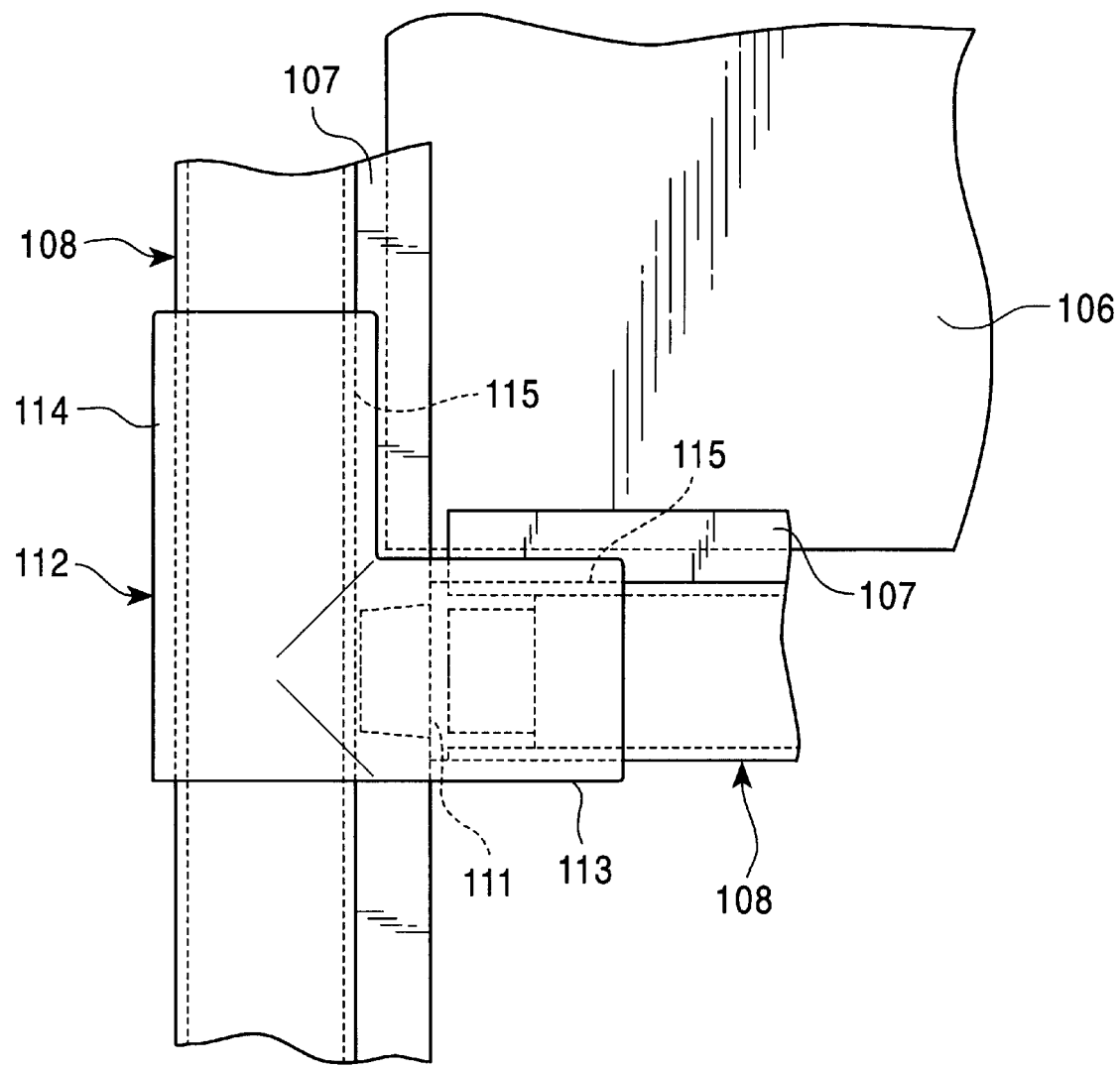
FIG. 42 is a partial plan view of the pipe framework assembled employing a still further conventional joint.

FIGS. 34, 35 and 36 are a plan view, a front elevation and a right side elevation of a modification of the second embodiment of a joint according to the present invention. In the shown modification, in place of the ring shaped stepped portion 18a formed between a small diameter portion 18 and a large diameter portion 18' of the cylindrical tube 14 in the foregoing second embodiment, the small diameter portion is closed by a partitioning wall 18b to form the large diameter portion as a blind bore to abut the end face of the resin-coated steel pipes on the partitioning wall 18b. The construction other than those set forth above is the same as the foregoing second embodiment. Therefore, elements common to the shown modification and the foregoing embodiment will be identified by the same reference numerals and detailed description thereof will be neglected for keeping the disclosure simple enough to facilitate clear understanding of the present invention.

In the modification set forth above, it becomes unnecessary to provide a construction for closing the end portion of the resin-coated steel pipe upon connecting a plurality of resin-coated steel pipes by the joint to contribute for simplification of the construction.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, in the foregoing embodiments, discussion has been given for the cases where the inwardly bent portions are formed on the tip ends of the covering ribs, it is not essential to provide the inwardly bent portions. In such case, it is preferable to form the outer edge of the tip end face of the covering rib into arc-shaped configuration. When the end face of the opening side of the other cylindrical tube is mated with the covering rib, the end face is located in flush with the tip end face.

On the other hand, the cylindrical tube is not necessarily in circular cross-section. When the resin-coated steel pipe is a polygonal tube, the cylindrical tube may be replaced with a hollow polygonal tube corresponding thereto.

Furthermore, the intersecting connection of the cylindrical tubes is not limited to be right angle at the reentrant angle, but can be obtuse angle or acute angle.

What is claimed is:

1. A joint, in which a plurality of synthetic resin hollow tubes are inserted which are a plurality of resin-coated steel pipes which are formed by applying a coating resin on a surface of a thin wall steel pipe and are formed with at least one pair of fitting ribs extending in an axial direction on said coating resin for holding an edge of a partitioning body, in order to connect said resin-coated steel pipes in an intersecting fashion, comprising a combination of said joint and said resin- coated steel pipes;

said joint having slits, permitting a pair of fitting ribs of said resin-coated steel pipes to pass therethrough, and formed on reentrant side of at least adjacent two hollow tubes among a plurality of hollow tubes at positions in one plane extending across respective axes of said hollow tubes and extending over the entire length;

said joint having covering ribs formed integrally with said hollow tubes and extending along both sides of the entire length of said slits for covering outer side surfaces of a pair of fitting ribs of said resin-coated steel pipe; and a small diameter portion is formed on an intersecting portion side of one of said adjacent hollow tubes with locating a stepped shoulder portion corresponding to a tip end portion of said covering rib of the other hollow tube, an auxiliary rib formed by extending a pair of covering ribs of said other hollow tube is extended at least to the center portion and one of said auxiliary ribs is connected to a reinforcement plate on an opening end side, and a tip end portion of said covering rib is formed with a covering portion covering the tip end face of said fitting ribs of said resin-coated steel pipe.

2. A joint, in which a plurality of synthetic resin hollow tubes are inserted which are a plurality of resin-coated steel pipes which are formed by applying a coating resin on a surface of a thin wall steel pipe and are formed with at least one pair of fitting ribs extending in an axial direction on said coating resin for holding an edge of a partitioning body, in order to connect said resin-coated steel pipes in an intersecting fashion, comprising a combination of said joint and said resin-coated steel pipes;

said joint having slits, permitting a pair of fitting ribs of said resin-coated steel pipes to pass therethrough, and formed on reentrant side of at least adjacent two hollow tubes among a plurality of hollow tubes at positions in one plane extending across respective axes of said hollow tubes and extending over the entire length;

said joint having ribs formed integrally with said hollow tubes and extending along both sides of the entire length of said slits for covering outer side surfaces of a pair of fitting ribs of said resin-coated steel pipe;

a small diameter portion is formed on an intersecting portion side of one of said adjacent hollow tubes with locating a stepped shoulder portion corresponding to a tip end portion of said covering rib of the other hollow tube, an auxiliary rib formed by extending a pair of covering ribs of said other hollow tube is extended at least to the center portion and one of said auxiliary ribs is connected to a reinforcement plate on an opening end side;

said reinforcement plate is accommodated within said resin-coated steel pipe, into which one hollow tube is inserted; and a tip end portion of said covering rib is formed with a covering portion covering the tip end face of said fitting ribs of said resin-coated steel pipe when inserted thereinto.

3. A joint, in which a plurality of synthetic resin hollow tubes are inserted which are a plurality of resin-coated steel pipes which are formed by applying a coating resin on a surface of a thin wall steel pipe and are formed with at least one pair of fitting ribs extending in an axial direction on said coating resin for holding an edge of a partitioning body, in order to connect said resin-coated steel pipes in an intersecting fashion, comprising a combination of said joint and said resin-coated steel pipes;

said joint having slits, permitting a pair of fitting ribs of said resin-coated steel pipes to pass therethrough, and formed on reentrant side of at least adjacent two hollow tubes among a plurality of hollow tubes at positions in one plane extending across respective axes of said hollow tubes and extending over the entire length;

said joint having covering ribs formed integrally with said hollow tubes and extending along both sides of the entire length of said slits for covering outer side surfaces of a pair of fitting ribs of said resin-coated steel pipe;

a small diameter portion is formed on an intersecting portion side of one of said adjacent hollow tubes with locating a stepped shoulder portion corresponding to a tip end portion of said covering rib of the other hollow tube, an auxiliary rib formed by extending a pair of covering ribs of said other hollow tube is extended at least to the center portion and one of said auxiliary ribs is connected to a reinforcement plate on an opening end side;

a tip end portion of said covering rib is formed with a covering portion covering the tip end face of said fitting ribs of said resin-coated steel pipe; and the end face on the opening end side of said other hollow tube is formed flush with the tip end face of the covering portion of said one of the hollow tubes.

4. A joint, in which a plurality of synthetic resin hollow tubes are inserted which are a plurality of resin-coated steel pipes which are formed by applying a coating resin on a surface of a thin wall steel pipe and are formed with at least one pair of fitting ribs extending in an axial direction on said coating resin for holding an edge of a partitioning body, in order to connect said resin-coated steel pipes in an intersecting fashion, comprising a combination of said joint and said resin-coated steel pipes;

said joint having slits, permitting a pair of fitting ribs of said resin-coated steel pipes to pass therethrough, and formed on reentrant side of at least adjacent two hollow tubes among a plurality of hollow tubes at positions in one plane extending across respective axes of said hollow tubes and extending over the entire length;

said joint having covering ribs formed integrally with said hollow tubes and extending along both sides of the entire length of said slits for covering outer side surfaces of a pair of fitting ribs of said resin-coated steel pipe;

a small diameter portion is formed on an intersecting portion side of one of said adjacent hollow tubes with locating a stepped shoulder portion corresponding to a tip end portion of said covering rib of the other hollow tube, an auxiliary rib formed by extending a pair of covering ribs of said other hollow tube is extended at least to the center portion and one of said auxiliary ribs is connected to a reinforcement plate on an opening end side;

said reinforcement plate is accommodated within said resin-coated steel pipe, into which one hollow tube is inserted;

a tip end portion of said covering rib is formed with a covering portion covering the tip end face of said fitting ribs of said resin-coated steel pipe; and the end face on the opening end side of said other hollow tube is formed flush with the tip end face of the covering portion of said one of the hollow tubes.

5. A joining structure for a pipe structure including a plurality of resin-coated steel pipes and a joint providing for connecting said resin-coated steel pipes with intersecting longitudinal axes of respective resin-coated steel pipes, comprising:

at least one pair of fitting ribs formed on a coating resin layer formed on an outer peripheral surface of a thin wall steel pipe forming said resin-coated steel pipe for holding an edge of a panel form body forming a part of said pipe structure;

hollow tubes respectively extending in directions corresponding to directions, to which respective of said resin-coated steel pipes to be joined, and integrally connected across a connecting portion in angled orientations, each of said hollow tubes accommodating an end portion of each resin-coated steel pipe to be jointed, slits being formed on reentrant sides of at least adjacent two hollow tubes and extending in axial directions of respective hollow tubes, for permitting said fitting ribs to outwardly extend therethrough; and covering ribs formed integrally with said hollow tubes and extending along both sides of the entire length of said slits for covering outer side surfaces of a pair of fitting ribs of each of said resin-coated steel pipe; and auxiliary ribs formed by extending a pair of covering ribs of the other hollow tube which is extended at least to the center portion and one of said auxiliary ribs is connected to a reinforcement plate on an opening end side.

6. A joining structure set forth in claim 5, wherein said reinforcement plate is accommodated within said resin-coated steel pipe, into which one hollow tube is inserted.

7. A joining structure set forth in claim 6, wherein the tip end portion of said covering rib is formed with a covering portion covering the tip end face of said fitting ribs of said resin-coated steel pipe.

8. A joining structure set forth in claim 6, wherein the end face on the opening end side of said other hollow tube is formed flush with the tip end face of said covering rib of said one of the hollow tubes.

* * * * *